United States Patent Office 3,346,138
Patented Oct. 10, 1967

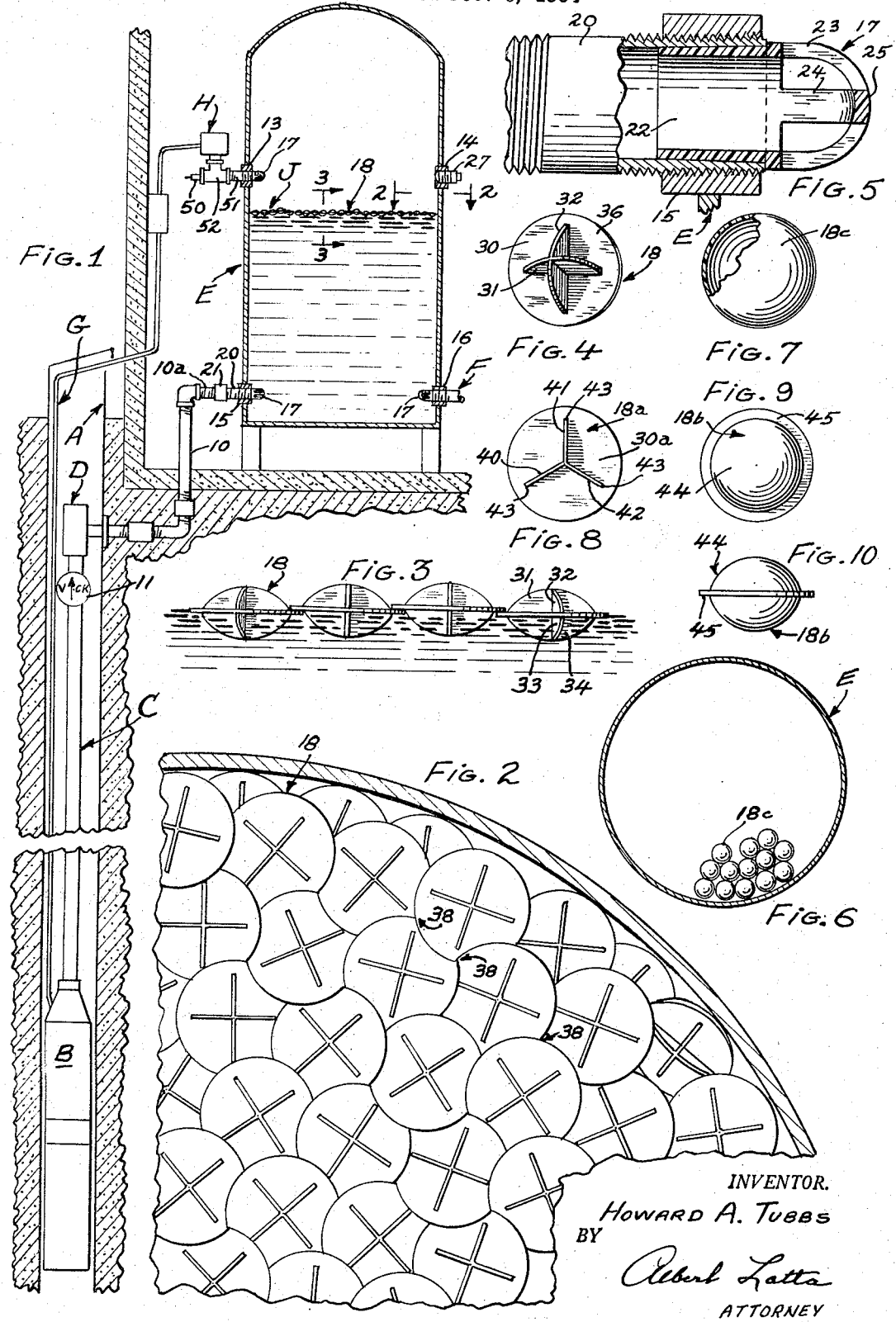

3,346,138
GAS-LIQUID SEPARATION
Howard A. Tubbs, 406 S. Elizabeth St.,
Whitewater, Wis. 53190
Filed Dec. 9, 1964, Ser. No. 417,084
11 Claims. (Cl. 220—26)

ABSTRACT OF THE DISCLOSURE

A water tank having a plurality of floats riding on the water to separate the air and water in the tank. The floats are disc-like with a rim and with lateral ribs inwardly of the rim. The floats overlap to separate the air-water interface.

This invention relates to gas-liquid separation for use in devices such as well systems of the type normally used in supplying water in rural areas for domestic or commercial purposes.

In particular, the invention relates to the type of well system employing a pressurized storage tank in which the quantity of air in the tank remains substantially constant during prolonged periods of use without the addittion of new air.

In the type of system contemplated the storage tank is of air tight construction and a portion of the area within the tank is occupied by water and the remaining portion is occupied by pressurized air. A membrane is interposed at the interface between the air and water to prevent, as nearly as possible, the absorption of the air by the water. In known prior art devices the membrane may be in the form of a flexible disc, the diameter of which is sometimes slightly less than the inside diameter of the tank to permit the disc to freely move up and down in response to change of water level in the tank. The disc is buoyant and rests on the surface of the water. The disc is of a material substantially impervious to water and air and thus prevents absorption of the air by the water except around the periphery of the disc.

Such discs are subject to certain disadvantages. Sand, silt, or other foreign material entering the tank at the water inlet can become lodged on top of the disc and eventually collapse same, nullifying the function of the disc in serving to prevent absorption of the air by the water. Scaling formed on the interior tank wall can snag the peripheral edge of the disc and cause the disc to become hung up as the water level in the tank recedes, thereby nullifying the intended function of the disc. Most tanks are pre-fabricated and have relatively small openings for plumbing fittings. The discs must, therefore, be capable of being rolled up in an elongated small diameter tubular form so as to be capable of insertion through a small opening in the tank and then must be "self unrolling" within the tank so as to lie on the surface of the water in disc form. Some tanks, while cylindrical in cross section, are horizontally mounted so that any disc to be inserted thereinto would not be able to cover the surface of the water under conditions of changing water level within the tank (the total water surface area of a horizontally mounted cylindrical tank changes as the water level changes).

The principal object of the invention is to provide apparatus which avoids all of the foregoing disadvantages of the disc type membrane.

Another object is to provide a well system which obviates the need for devices which automatically introduce new air into the tank periodically—such devices as air volume controls, bleeders, etc.

A specific object is to provide a membrane which is comprised of a multiplicity of separate interengaging floats which collectively form a substantially singular layer membrane for separating the water and the air in the tank to prevent absorption of the air by the water.

A further specific object is to provide a well system employing a multiple float type membrane in which the floats can be readily inserted through a small tank opening and in which barrier means are provided for preventing escape of the floats through the tank openings.

Other objects and advantages of the invention will be apparent from the ensuing specification and appended drawing in which:

FIGURE 1 is a schematic view of a well system employing the invention.

FIGURE 2 is an enlarged fragmentary plan view taken on the line 2—2 of FIGURE 1.

FIGURE 3 is an enlarged fragmentary sectional view taken on the line 3—3 of FIGURE 1.

FIGURE 4 is a perspective detail view of the preferred form of float.

FIGURE 5 is an enlarged sectional view of one tank opening and float barrier.

FIGURE 6 is a sectional plan view similar to FIGURE 2 but showing a modified form of float.

FIGURE 7 is a detail view of the float of FIGURE 6.

FIGURE 8 is a detail plan view of another form of float.

FIGURE 9 is a detail plan view of another form of float.

FIGURE 10 is a detail side elevational view of the float of FIGURE 9.

In FIGURE 1 I have shown one type of well system with which the invention may be employed. However, it will be understood that the invention may be employed with any well system in which a storage tank is provided for storing water which is exposed to pressurized air.

The type of well system shown in FIGURE 1 includes the well casing A, which in practice would be made up of sections of pipe secured together to form a continuous pipe extending down into the ground to a depth sufficient to encounter the source of water. The well casing normally has a common inside diameter throughout its length to accommodate the pump and motor unit B which is submerged at all times below water level within the casing. The pump and motor unit is suspended from the drop pipe C which, of course, is formed of sections connected together so as to extend throughout the length of the well casing continuously. The upper end of the drop pipe is connected to a coupling D from whence the water enters the storage tank E and is dispensed into the house or other place by usage through the discharge pipe F (only a portion of which is shown). Suitable electric wiring G leads from the source of electricity (not shown) into the interior of the well casing and on down through the well casing to the pump and motor unit. A pressure switch H of conventional construction is responsive to the air pressure within the storage tank for automatically controlling the operation of the pump and motor unit.

The coupling D may be of conventional construction, such as, for example, of the type shown in Patent No. 2,918,972. The water thus travels up through the drop or feed pipe C from the pump and motor unit through the coupling D and thence through the water transfer pipe 10 into the interior of the storage tank E.

In a typical well system, such as a 20 lb.–40 lb. system, the pressure switch H energizes the electrical circuit when the pressure in the tank drops to 20 lbs. The pump commences operating to add water into the storage tank and the water level in the tank rises, thereby compressing the air in the tank until the pressure reaches 40 lbs. Then the electrical circuit is de-energized by the switch H thereby stopping the pump. The water level, indicated by the letter J in FIGURE 1, is intended to indicate the approximate desired water level wherein pump operation would be imminent for adding more water into the tank. When the pump ceases operating, a one way check valve 11 prevents the water in the storage tank from running back down through the drop pipe C. As long as the quantity of air within the tank remains constant, there is no need to add any additional air into the tank. Air loss results from any leakage, such as at tank openings with faulty fittings, and air loss also results from the air being exposed to the water in the tank so as to be absorbed thereby. The invention is directed toward drastically reducing air loss by absorption.

In FIGURE 1 I have shown tank fittings 13, 14, 15 and 16. The fittings may be of a size, for example, to accommodate standard 1" plumbing pipes. It will be understood that the invention is equally usable with storage tanks of various capacities, having larger size tank fittings and plumbing pipes and it is only necessary to increase the shank sizes of the barriers 17 to fit the larger diameter pipe fitting. The invention is also equally usable with well systems employing higher pressure ranges than a 20 lb.–40 lb. system. Transfer pipe 10a may be threaded into fitting 15 and discharge pipe F may be threaded into fitting 16. Assuming that fittings 13 and 14 are of the same inside diameter as fittings 15 and 16 so as to accommodate plumbing pipes of common diameter, then it becomes necessary to provide suitable barriers 17 at the fittings 13, 15 and 16 to prevent loss of the floats, which are identified generally by the numeral 18, through the tank fittings. Viewing FIGURE 5 there is shown one type of arrangement in which a standard plumbing nipple 20 is threaded into tank fitting 15. Pipe section 10a is connected to the nipple with a suitable standard coupling 21. The barrier 17 has its cylindrical shank portion 22 secured in the end of the nipple as by press fit, cementing or other form of fastening, prior to threading the nipple into the tank fitting. The inner end of the barrier may consist of arcuate straps 23 and 24 emanating from the barrier shank and intersecting at 25 to form, in effect, a cage with ample sized openings for permitting unrestricted flow of the water coming into the tank—such openings being small enough to prevent the floats 18 from passing therethrough. While tank fittings 15 and 16 are normally always submerged in the tank water, the tank could become drained of water, such as because of an electrical power failure nullifying pump operation, hence the need for barriers 17 at the fittings 15 and 16.

The type of floats shown in FIGURES 4, 9 and 10 may be appropriately termed as Saturn floats in that they employ a circular rim encircling central structures of an arcuate nature. Thus, a float which consists of a flat, substantially circular rim, which encircles a central structure which projects laterally on either side of the rim and which structure has arcuate surfaces throughout its extent; and which float is substantially impervious to water or air and has a specific weight which is less than water; and which float when placed on a water surface will, by gravity, topple into a substantially horizontal position, with the plane of the rim substantially parallel to the surface of the water—such a float will be defined herein as a Saturn float.

The preferred form of float is shown in FIGURE 4 and consists of a flat disc having circumferentially arranged intersecting arcuate ribs formed on either side thereof. I prefer to use a low cost synthetic resin material (such as polyethylene) with an injection molding process, employing multiple cavity dies, for fabricating the floats rapidly in large quantities at very low per unit cost. The resultant float may have a specific weight of about .91 to .925 so as to be buoyant in water and yet heavy enough to function automatically in forming, in conjunction with other floats, the desired membrane, as will be explained hereinafter. The floats shown in FIGURES 2, 3, 4, 7, 8, 9 and 10 are actual size and are small enough in their maximum diameter (in the plane of the disc) to be readily inserted through a standard size nipple, such as nipple 20, during initial installation of the floats into the interior of the tank. In practice the floats are preferably added to the interior of the tank through an opening such as fitting 14 prior to closing off the fitting opening with a suitable closure plug 27. Such opening would be larger than the inside diameter of nipple 20 and feeding the floats into the interior of the tank (as by means of a funnel or scoop) would be much faster.

Referring to FIGURES 2, 3 and 4, each float comprises the main body 30 in the form of a flat disc which is approximately 1/16" thick and 1" in diameter (the inside diameter of nipple 20 being slightly more than 1"). The disc is circular in shape for obtaining maximum overlapping of adjacent discs. Each side of the disc is provided with intersecting arcuate ribs 31, 32 33 and 34, each rib, in effect, forming a segment of a circle and each rib being intended as identical in length, thickness and configuration so that each side of the disc can be considered alternately as the top or the bottom. The ribs on each side of the disc intersect each other at right angles at the disc center and in effect form four quadrants (on each side of the disc) which are 90° apart with reference to the circumference of the disc. The outer ends of each rib terminate approximately 1/8" short of the periphery of the disc so as to, in effect, form an uninterrupted flat annular rim 36 at the peripheral area of the disc. Viewing FIGURE 2 it will be noted that the width of the annular rim is such that when the rims of adjacent discs are in overlapping condition, there will be no air gaps at the various interstices (identified by the numeral 38). Under ideal rim overlapping conditions, as shown in FIGURE 2, the membrane which is formed by the floats collectively will permit only a relatively small total of surface area of water to be exposed directly to the air in the tank, thereby very effectively reducing the total absorption of air by the water to minimum conditions.

In practice, I have found that the agitation of the tank water, when new water is flowing into the tank under pump operation, will cause the floats to shift about relative to each other and to then settle in membrane form in which rim overlapping conditions come very close to approaching the ideal conditions shown in FIGURE 2. The reasons for this condition reside in the construction of each float. The ribs are arcuate and are also very thin (about 1/32" thick), consequently when a disc periphery contacts a rib, there is a minimum amount of friction encountered—hence no deterrence to the sliding of the disc periphery down the rib until the disc assumes the resultant horizontal position shown in FIGURE 3. Since the bulk of the weight of each float is in the disc body 30, the center of gravity of each float is such that under the force of gravity, each float will topple toward horizontal position —the floats will not stand "on end" in the water.

By employing the rib formations shown in FIGURE 4 (four quadrants on each side of a disc and spaced 90° apart) it is impossible to obtain a rim overlapping condition—extent of overlap—which is objectionable. That is, the maximum extent of rim overlap is not such as to impede the formation of a suitable membrane for desired end results. In the form of float 18a shown in FIGURE 8 there are formed on each side of disc body 30a three inclined quadrant ribs 40, 41 and 42 (instead of four arcuate ribs as in FIGURE 4) and they are spaced 120° apart. Thus the extent of possible rim overlap is greater with this float and a larger number of floats would be needed per tank than in the case of the "four quadrant" float in order to form an acceptable resultant membrane. Each inclined rib would commence from the axial center of the float (this being the greatest axial dimension from the plane of the float disc) and the inclination of each rib would be continuous from such axial center to the point of termination 43.

In a tank having an inside diameter of 12", a total of about 200 of the floats of FIGURE 4 will be sufficient to form a membrane covering the entire surface of the water. This quantity includes a safety factor, wherein, a few of the floats will end up resting harmlessly atop the "membrane layer." A tank having an inside diameter of 14" would require about 270 FIGURE 4 floats and a tank of 20" inside diameter would require about 680 FIGURE 4 floats.

The floats (of all figures of the drawing) are formed of a material which is substantially impervious to air or water and hence when collectively forming the singular layer membrane as shown in FIGURES 2 and 3 absorption of air into the water can only occur wherever a gap in the membrane is present. Such gaps are unavoidable adjacent the tank wall (as is apparent in FIGURE 2). However, the surface area of water which is exposed directly to the tank air as a result of gaps represents only a small percentage of the total surface area of the water in the tank—probably less than 5%—and hence the end results are very acceptable. In practice I have found that in excess of twenty months can pass without any need for adding new air into the storage tank.

In the type of float 18b shown in FIGURES 9 and 10 a spheroidal body 44 is encircled by an annular rim 45, formed integrally therewith. The extent of possible rim overlap of adjacent floats of this type is minimum and constant and is, of course, less than that of the floats of FIGURES 4 or 8, however, it would be difficult to maintain a per unit manufacturing cost comparable to such cost of the floats of FIGURES 4 and 8.

In the type of float 18c shown in FIGURES 6 and 7, a spheric shape is employed. Each float may be of hollow construction and a synthetic resin, such as polyethylene, is preferably used. The spheric type of float results in air gaps being formed between each three adjacent spheres, as can be seen in FIGURE 6, and consequently the total area of water which is exposed to air is greater than in the case of the type of floats with overlapping rims, and it will be necessary to add new air into the tank more often. I have found in practice, however, that spheric floats will retard absorption of air by the water sufficiently to permit operation of the water system for as much as five months before it is necessary to add new air into the tank. The use of spheric floats also assures excellent results in the formation of the membrane without need for extra floats as a safety factor, since spheric surfaces encounter minimum friction conditions between adjacent floats as they settle into singular layer membrane condition. In order, however, to avoid the air gaps between each three adjacent spheres, the quantity of spheres used can be doubled thereby providing enough of them to form a second membrane layer above the first layer. The spheres of the second layer will nestle into the interstices between the spheres of the first layer thereby closing off the air gaps in the first layer. This arrangement results in undesirable cost increase. However, it provides the desired results of increasing the time intervals for adding new air into the tank to periods in excess of twenty months each. In FIGURE 6 only a "handful" of spheric floats are shown on the surface of the water in the tank. It will be understood that enough additional spheric floats would be employed to cover the entire surface area of the tank water. With reference to each of the floats of FIGURES 4, 7, 8, 9 and 10, it will be understood that they are sufficiently rigid in construction as to not become distorted out of their original shape when they bump against each other (as under conditions of water agitation within the tank).

*Operation*

In the operation of a well system of the type shown in FIGURE 1, assuming the tank to be empty, the pump commences operating and pumps water up through drop pipe C, coupling D, transfer pipes 10 and 10a, and thence into the tank. The quantity of air in the tank is at atmospheric pressure (considered to be zero for purposes herein) and the water commences rising in the tank, compressing the air above it. The floats 18 will rise along with the water level since they are buoyant. The floats will be agitated due to the surge of the incoming water and they will shift about, forming the desired singular layer membrane on the surface of the water. If the water rises too far in the tank before the desired pressure is reached for terminating pump operation, then additional air can be pumped into the tank through valve 50, as by means of a compressor or a "bicycle" pump. Some water in the tank can be drained off through pipe F while the additional air is being added into the tank. The addition of air into the tank can be terminated when the desired quantity is pumped into the tank (to achieve a desirable water level condition such as is shown in FIGURE 1). Then it will not be necessary to again add air into the tank through valve 50 for many months.

The valve 50 is of conventional construction, such as the type used in bicycle tires, and is exposed to tank pressure at all times through nipple 51 and T 52. Tank pressure, of course, keeps the valve closed until such time as a bicycle pump or compressor is connected to the valve body and air, at a pressure exceeding tank pressure, causes the one way valve to open to permit new air to be added into the tank. The pressure switch H is, of course, also exposed to tank pressure at all times through nipple 51 and T 52.

While the present description of the invention has been related to air-water separation, the concept of the invention may be used in connection with separation of other suitable gases and liquids without departing from the spirit of the invention.

I claim:

1. In a pressurized water storage tank wherein a portion of the area within the tank is occupied by water and another portion of such area is occupied by air which exerts pressure on the water surface at the interface between the water and air, apparatus for retarding the rate of absorption of the air by the water, said apparatus comprising:
   (a) a multicplicity of interengaging floats physically unattached to each other and collectively disposed at the surface of the water to provide a substantially single layer membrane for substantially separating the interface between the water and the air,
   (b) said floats being buoyant in water and being formed of material which substantially resists absorption of air or water,
   (c) said floats being provided with rims at said interface which overlap approximately in the plane of said interface to thereby substantially separate the air and water.

2. Apparatus as set forth in claim 1 wherein the floats are formed substantially similarly in size and shape and wherein each float comprises a rimmed spheroidal body.

3. Apparatus as set forth in claim 1 wherein each float is formed as a substantially flat disc having rib-like curved protuberances projecting outwardly from opposite sides of the discs.

4. Apparatus as set forth in claim 1 wherein the floats are formed as substantially circular discs having curved ribs projecting outwardly from opposite sides of the discs, said ribs terminating short of the perimeters of the discs whereby to form uninterrupted annular rims on the discs and said annular rims of adjacent discs overlap each other.

5. An article of manufacture comprising a substantially flat and substantially circular disc; a plurality of radially directed arcuate ribs projecting outwardly from each flat face of the disc; the ribs on each disc face being circumferentially arranged not more than 120° from each other and each rib being of a length less than the radius of the disc, whereby to form an uninterrupted annular rim at the circumference area of the disc; said disc being buoyant in water and being formed of a material which substantially resists absorption of air and water.

6. An article of manufacture as set forth in claim 5 wherein there are at least four radially directed arcuate ribs on each opposite face of the disc and said ribs are substantially equidistantly circumferentially in relation to each other.

7. An article of manufacture comprising: a substantially flat and substantially circular disc; a plurality of radially directed innclined ribs projecting outwardly from each flat face of the disc; the ribs on each disc face being circumferentially arranged not more than 120° from each other and each rib being of a length less than the radius of the disc, whereby to form an uninterrupted annular rim at the circumference area of the disc; said disc being buoyant in water and being formed of a material which substantially resists absorption of air and water.

8. A float for use in substantially preventing contact between air and water in an enclosed water tank, said float comprising:
(a) a thin flat generally circular disc having a pair of flat faces and an edge,
(b) a plurality of radial circumferentially arranged ribs projecting outwardly from each disc face, with the ribs on each face intersecting at the disc center and with each rib on one face corresponding in position to a similar rib on the opposite face,
(c) said ribs terminating inwardly of each disc edge to form a rim adapted to engage a plurality of adjacent floats.

9. In a water storage tank having water and air therein which come together at an interface:
(a) a plurality of thin flat generally circular buoyant floats disposed in the plane of said interface,
b) each said float comprising a disc-like body having an outer rim and having a plurality of radial ribs disposed inwardly of said rim and extending laterally of said body,
(c) the rims of at least some of said floats overlapping the rims of adjacent floats in approximately the plane of said interface and engaging ribs on said adjacent floats to substantially effectively separate said air and water.

10. In a pressurized liquid storage tank wherein a portion of the area within the tank is occupied by a liquid and another portion of such area is occupied by a gas which exerts pressure on the liquid surface at the interface between the liquid and gas, apparatus for retarding the rate of absorption of the gas by the liquid, said apparatus comprising:
(a) a multiplicity of interengaging floats physically unattached to each other and collectively disposed at the surface of the liquid to provide a substantially single layer membrane for substantialy separating the interface between the liquid and the gas,
(b) said floats being buoyant in the liquid and being formed of material which substantially resists absorption of the gas or liquid,
(c) said floats being provided with rims at said interface which mutually overlap approximately in the plane of said interface to thereby substantially separate the gas and liquid.

11. A float for use in substantially preventing contact between a gas and a liquid in an enclosed tank, said float comprising:
(a) a thin flat generally circular disc having a pair of flat faces and an edge,
(b) a plurality of radial circumferentially arranged ribs projecting outwardly from each disc face, with the ribs on each face intersecting at the disc center and with each rib on one face corresponding in position to a similar rib on the opposite face,
(c) said ribs terminating inwardly of each disc edge to form a rim adapted to engage a plurality of adjacent floats.

References Cited

UNITED STATES PATENTS

| | | | |
|---|---|---|---|
| 1,990,918 | 2/1935 | Ramsden | 220—26 |
| 2,001,610 | 5/1935 | Hildenbrand. | |
| 2,710,832 | 6/1955 | Harr | 220—26 |
| 3,003,659 | 10/1961 | Miller | 220—85 |
| 3,253,732 | 5/1966 | Dempster | 220—26 |
| 3,256,977 | 6/1966 | Pettersen | 220—26 |

FOREIGN PATENTS 269,706   4/1927   Great Britain.

THERON E. CONDON, *Primary Examiner.*

R. H. SCHWARTZ, *Assistant Examiner.*